United States Patent [19]

Fujibayashi

[11] Patent Number: 4,692,818
[45] Date of Patent: Sep. 8, 1987

[54] DUAL AUDIO TRACK RECORDING SYSTEM IN WHICH ONE TRACK ALSO CONTAINS A CONTROL SIGNAL

[75] Inventor: Kenji Fujibayashi, Tokyo, Japan

[73] Assignee: Olympus Optical Co., Ltd., Tokyo, Japan

[21] Appl. No.: 575,890

[22] Filed: Feb. 1, 1984

[51] Int. Cl.⁴ .......................................... G11B 15/087
[52] U.S. Cl. ..................................... 360/22; 360/20; 360/27
[58] Field of Search ................. 360/22, 27, 72.1, 72.2, 360/74.4, 79, 80, 66, 61, 73; 369/28, 46–50, 70, 92

[56] References Cited

U.S. PATENT DOCUMENTS

| | | | |
|---|---|---|---|
| 2,787,669 | 4/1957 | Flam et al. | 369/47 |
| 3,705,271 | 12/1972 | De Bell et al. | 360/79 |
| 4,121,264 | 10/1978 | Kishi et al. | |
| 4,244,009 | 1/1981 | Satoh | |
| 4,317,142 | 2/1982 | Wray | 360/61 |
| 4,338,529 | 7/1982 | Fujibayashi | 360/72.2 |
| 4,344,095 | 8/1982 | Furuta | 360/73 |
| 4,389,685 | 6/1983 | Furuta | 360/72.2 |
| 4,420,777 | 12/1983 | Furuta | 360/63 |
| 4,470,085 | 9/1984 | Kanayama | 369/47 |
| 4,473,854 | 9/1984 | Oishi et al. | 360/72.2 |

OTHER PUBLICATIONS

J. Moir, Magnetic Recording Review, Apr. 1981, pp. 74–76.
Sony Basic Video Recording Course, Booklet #1, Elements of Magnetic Recording, p. 15, ©1979.
A. Hamm, Tape–Slide Synchronizer, Elektor Jul./Aug. 1979, vol. 51/52, No. 7-8, pp. 7-92 through 7-94.

Primary Examiner—Robert L. Richardson
Assistant Examiner—James E. Tomassini
Attorney, Agent, or Firm—Frishauf, Holtz, Goodman & Woodward

[57] ABSTRACT

In a cue recording system for a tape recorder, an audio signal is recorded by a first recording section on a first track of a tape. In a second recording section, a cue signal is superposed on the audio signal. The composite signal formed of the audio and cue signals is then recorded on the second track of the tape. In the playback mode, the audio signal and the cue signal recorded on the second track are separated by a filter. When the separated second-track audio signal is mixed with a first-track reproduced output, the resultant audio signal has substantially the same low-frequency response characteristic as a stereo head system, and a same S/N ratio as the monaural head system. An insufficient low-frequency response of the second track is compensated by the flat frequency response of the first track. Degradation of the S/N ratio of the signal of the first track can be improved by the mid or higher frequency component of the audio signal of the second track.

18 Claims, 3 Drawing Figures

F I G. 1

DUAL AUDIO TRACK RECORDING SYSTEM IN WHICH ONE TRACK ALSO CONTAINS A CONTROL SIGNAL

BACKGROUND OF THE INVENTION

The present invention relates to a recording/reproducing apparatus and, more particularly, to an improvement of a cue recording system for a tape recorder.

It is convenient to use cuing to find a particular recorded segment on a magnetic tape. For example, a cue signal is recorded at the beginning of a speech of a specific person A. When this cue signal is detected in the playback mode, the speech of person A can be quickly searched and reproduced.

The following two systems are known to record/reproduce the cue signal of the type described above.

(1) System using a monaural (one channel) record/-playback head

According to this system, a low-frequency component of an audio signal is cut off or removed, and a cue signal having the same frequency as that of the low-frequency component is superposed on the audio signal. Such a composite signal is recorded on a single recording track. In the playback mode, a filter having a sharp cutoff slope (e.g., −18 to −24 dB/oct) is required to separate the cue signal from the audio signal having voice frequency components. A filter of this type is expensive. Further, since the audio signal is separated by a high-pass filter from the cue signal, the low-frequency response of the audio signal is degraded.

(2) System using a stereo (two-channel) record/-playback head

According to this system, the audio signal is recorded on the first recording track, and the cue signal is recorded on the second recording track. In the playback mode, the audio signal is reproduced from the first track, while the cue signal is reproduced from the second track. In this case, unlike the system using the monaural head, said expensive filter is not necessary. Thus, degradation of the low-frequency response of the audio signal can be avoided, and the frequency of the cue signal may be freely selected. However, the recording track width in the system using the stereo head becomes less than half of that used in the system using the monaural head. For this reason, an output level of the stereo head system becomes lower than that of the monaural head system by 3 dB or more. Therefore, an S/N ratio of the reproduced audio signal in the stereo head system is degraded.

SUMMARY OF THE INVENTION

The present invention has been made in consideration of the above situation, and has for its object to provide a cue recording system for a magnetic recorder, wherein the disadvantage (use of an expensive filter having a sharp cutoff slope, and degradation of a low-frequency response of the audio signal) of a monaural (one-channel) head system and the disadvantage (degradation of an S/N ratio of a reproduced audio signal) of a stereo head system can be substantially eliminated.

To achieve the above objective, there is provided a cue recording system for a magnetic recorder as follows. An audio signal is recorded on a first track, and a cue signal superposed on the audio signal is recorded on a second track. In the playback mode, the audio signal and the cue signal which were recorded on the second track are separated by a simple filter. When the separated second-track audio signal is combined with the first-track reproduced output, the resultant audio signal has substantially the same low-frequency response characteristic as the stereo head system and the same S/N ratio as the monaural head system. The insufficient low-frequency response of the second track is compensated by the flat frequency response of the first track. The degradation of the S/N ratio of the signal of the first track can be improved by the mid or higher frequency component of the audio signal of the second track.

In addition, the low-frequency response is guaranteed by the signal component of the first track. Therefore, the low-frequency response of the second-track may be poor. This means that the low-cutoff-frequency of the frequency response of the second-track audio signal can be sufficiently deviated from the cue signal frequency. Therefore, the filter used for separating the audio signal and the cue signal of the second track may have a gentle cutoff slope in practice. In fact, the low-frequency cutoff of the audio signal of the second track can be achieved only by selecting a small time constant of a CR signal coupling stage of an amplifier. Therefore, an expensive filter having a sharp cutoff slope is not required.

Furthermore, since the cue signal is not recorded on the first track, the low-frequency component of the audio signal can be boosted and recorded on the first track independently of the cue. When the first-track audio signal with a boosted low frequency component is reproduced and then this reproduced signal is superposed on the second-track reproduced signal which lacks low frequency components, the resultant low-frequency response of the audio signal is effectively improved.

BRIEF DESCRIPTION OF THE DRAWINGS

FIG. 1 is a diagram showing a cue recording system for a magnetic recorder according to an embodiment of the present invention;

DETAILED DESCRIPTION OF THE PREFERRED EMBODIMENT

Figures 2, 3:
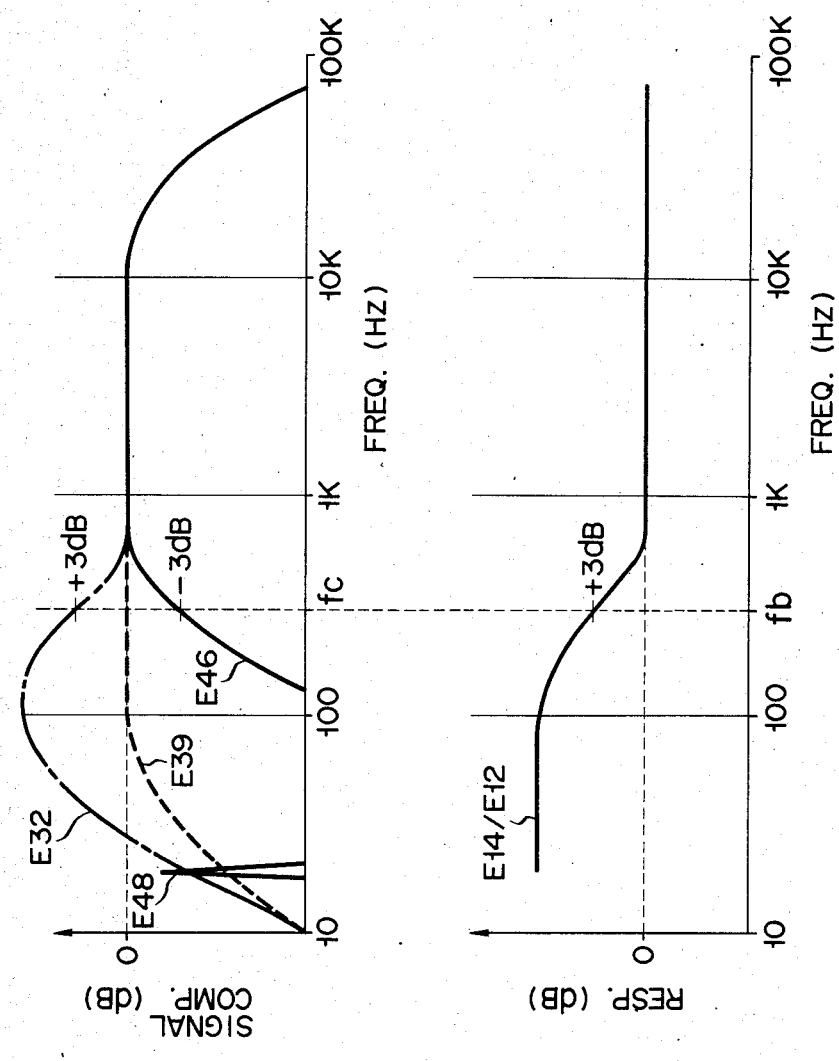
FIG. 2 is a graph showing the frequency component of a recorded signal of a first track and the frequency responses of recorded signals (cue and audio signals) of a second track.
FIG. 3 is a graph showing the low-frequency response boosting characteristic for the first track.

A cue recording system for a magnetic recorder according to an embodiment of the present invention will be described with reference to the accompanying drawings. In particular, a two-channel tape recorder is subjected to a microphone recording.

An audio signal E10 picked up by a microphone 10 is amplified by a microphone amplifier 12, thereby obtaining a recording signal E12. Signal E12 is boosted for a low-frequency by an equalizer (EQ) 14. The input/output characteristics of EQ 14 are shown in FIG. 3. An output E14 from EQ 14 is supplied to a recording amplifier 16. Recording amplifier 16 generates a recording signal E16. Signal E16 is superposed on a bias current from a bias oscillator (not shown). Signal E16 superposed on the bias current is supplied to a record/-playback head 20A through an R terminal of a record/-playback selector switch 18A. Information corresponding to the recording switch E12 is recorded by head 20A on a first recording track T1 of a magnetic tape 22.

Elements 14, 16 and 20A constitute a first recording section 21 for recording the recording signal E12 on the first recording track T1.

Signal E12 is also supplied to a high-pass filter (HPF) 24. HPF 24 may comprise a CR filter having a cutoff frequency fc of 300 Hz. A signal E24, obtained by cutting off a low-frequency component of signal E12, is supplied to a recording amplifier 26. Recording amplifier 26 may have the same arrangement as the recording amplifier 16, and generates a recording signal E26. A cue signal E28 from a cue generator 28 is superposed on signal E26. Cue signal E28 is a single tone having the lowest audible frequency of about 20 Hz. Cue signal E28 is generated when a cue signal recording switch 30 is turned on. Cue generator 28 may be a conventional astable multivibrator whose actuation is controlled by switch 30. When the cutoff frequency fc of HPF 24 is about 300 Hz, cue signal E28 of 20 Hz falls within the cutting-off frequency range of HPF 24.

A bias current having a proper magnitude is superposed on a composite signal of recording signal E26 and cue signal E28. Composite signal E26+E28 on the bias current is supplied to a record/playback head 20B through an R terminal of a record/playback selector switch 18B. Information corresponding to the low-frequency-cutoff recording signal E12 and cue signal E28 is recorded on a second recording track T2 of magnetic tape 22.

Elements 24, 26, 28, 30 and 20B constitute a second recording section 31 for recording on the second recording track T2 the recording signal E12 from which a low-frequency component is cut off, and the cue signal E28 whose frequency falls within the cutoff-low-frequency range.

In the playback mode, selector switches 18A and 18B are switched in P (playback) positions.

The information on first recording track T1 is detected by record/playback head 20A. An output E20A from head 20A is amplified by a first track playback amplifier 32 which generates a reproduced output E32. Playback amplifier 32 includes an equalizer for making the frequency response of output E32 substantially flat with respect to E14.

Playback amplifier 32 constitutes a first reproduction section 33 for reproducing from the first recording track T1 the information E32 which corresponds to the recording signal E12.

Information on second recording track T2 is detected by record/playback head 20B. An output E20B from head 20B is amplified by a second track playback amplifier 44 which generates a reproduced output E44. The equalizing frequency characteristic of playback amplifier 44 may or may not be the same as that of amplifier 32.

Reproduced output E44 is supplied to an HPF 46. HPF 46 may comprise a CR low-cut filter having a cutoff frequency fc of 300 Hz. The cue signal component is separated by HPF 46 from output E44, thereby obtaining a reproduced output E46.

Elements 44 and 46 constitute a second reproduction section 47 for reproducing from the second recording track T2 the information E46 which corresponds to the recording signal E24 from which the low-frequency component has been cut off.

Output E44 is also supplied to a low-pass or band-pass filter (LPF/BPF) 48. When the frequency of cue signal E28 is about 20 Hz and the tape travel speed in the cue mode is five to 10 times the normal tape speed, the frequency of the cue signal included in output E44 becomes 100 to 200 Hz. Therefore, filter 48 may comprise either a low-pass filter having a cutoff frequency of about 220 Hz, or a band-pass filter having a band-pass width of about 90 to 220 Hz. Cue signal E48 is separated from output E44 by LPF/BPF 48, and is supplied to a cue detector 50. Cue detector 50 may be formed of an integrator for integrating the signal E48 and a comparator for comparing an output of the integrator with a reference potential. This comparator responds to the cue signal E48 having a level higher than the reference potential, and releases the fast-forward mode (cuing mode) of a tape recorder (not shown).

Elements 48 and 50 constitute a cue detecting section 51 for detecting the cue signal E48 in accordance with the recorded content of the second recording track T2.

Output E32 from first reproduction section 33 and output E46 from second reproduction section 47 are supplied to an input terminal of a volume controller 38 respectively through resistors 34 and 36. Outputs E32 and E46 are mixed at a given ratio which is determined by the resistances of resistors 34 and 36, thereby obtaining a reproduced signal E39.

Elements 34 to 38 constitute a signal mixer 39 for mixing the output E32 from the first reproduction section 33 with the output E46 from the second reproduction section 47 at the predetermined ratio and for generating the reproduced signal E39 corresponding to the recording signal E12.

Signal E38 corresponding to reproduced signal E39 is generated from a slider of volume controller 38. This signal E38 is amplified by a power amplifier 40 and is supplied to a loudspeaker 42. Sound corresponding to recording signal E12 is produced at loudspeaker 42.

Figure 1:
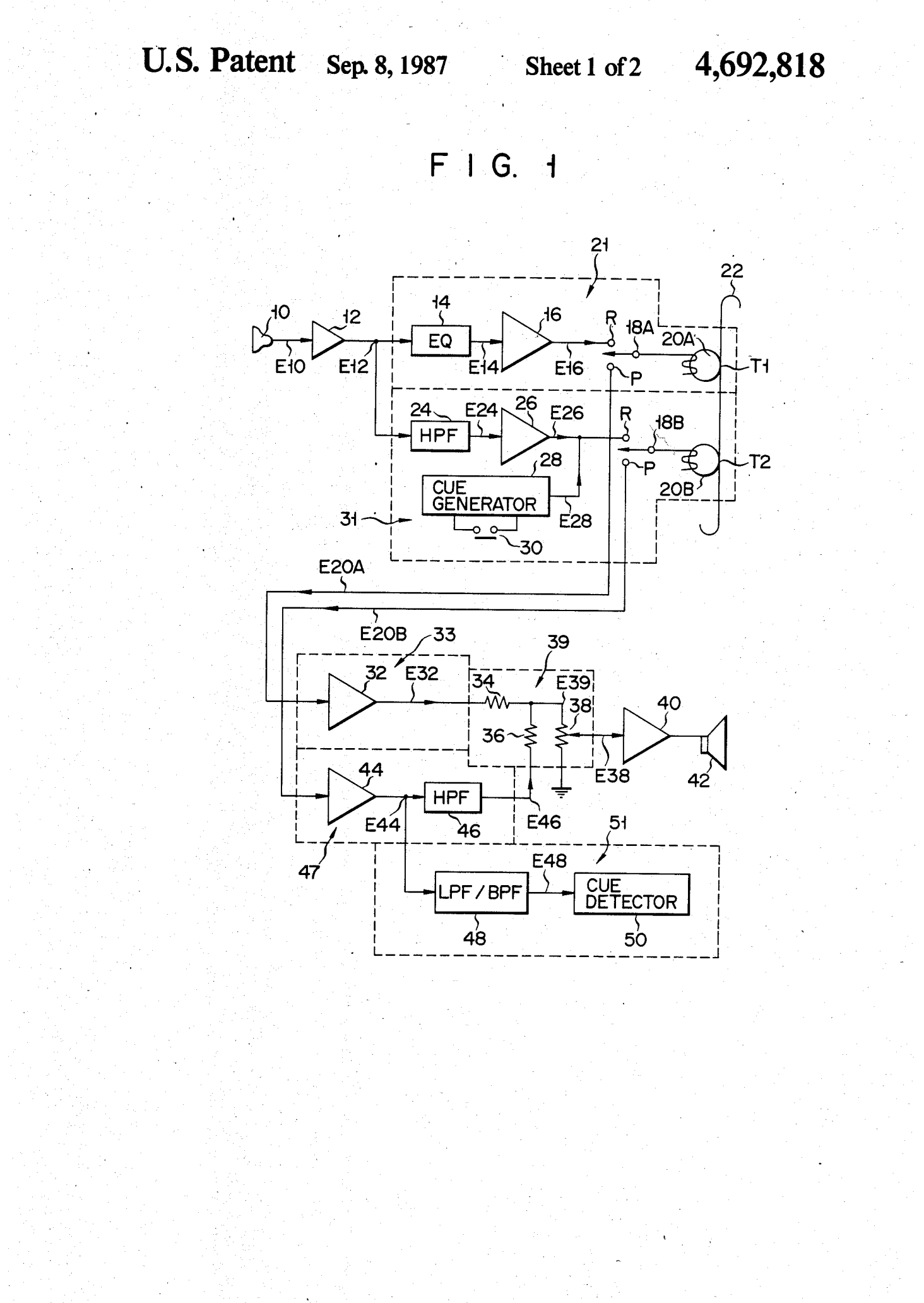

FIG. 2 is a graph showing the frequency components of the signals at the main parts of the circuit shown in FIG. 1. FIG. 3 is a graph showing the frequency response of EQ 14 which is determined in accordance with the characteristics shown in FIG. 2.

A frequency component of output E46 being lower than, e.g., 300 Hz is cutoff by HPF 46 which has a cutoff frequency fc of 300 Hz. The upper-cutoff characteristic of the output E46 is due to the finite frequency response of the tape recorder system.

Signal E14 to be recorded on first track T1 has a low-frequency component boosted by EQ 14, as shown in FIG. 3. The boost start frequency fb of EQ 14 is substantially the same as the cutoff frequency fc of HPF 46. However, the boost start frequency fb may differ from the cutoff frequency fc. Low-frequency boosting by means of EQ 14 causes an emphasis of a frequency response of output E32 below fc, as shown in FIG. 2. As a result, the low-frequency response of output E39 corresponding to the combination of outputs E32 and E46 can be greatly improved. The frequency component of signal E39 overlaps the frequency component (e.g. 20 Hz) of cue signal E48. However, irrespective of this overlapping, the cue signal E48 can be separated from output E44 by means of a filter and a comparator.

The recording equalizer of recording amplifier 16 may also serve for the low-frequency boosting function of EQ 14. In addition, the low-frequency characteristic of output E39 can be better than that of output E46 even if the low-frequency boosting shown in FIG. 3 is not performed.

In the embodiment shown in FIG. 1, the tape recorder has record/playback stereo heads 20A and 20B. These heads may be replaced with a record head and a playback head, respectively. In addition to this modification, frequency characteristics inherent to associated circuitries may be utilized for HPFs 24 and 46. For example, if a time constant of the signal coupling of recording amplifier 26 is arranged such that a frequency response below fc (300 Hz) is decreased, HPF 24 may be omitted. HPF 46 may be simply replaced with a capacitor. In this case, when the capacitance of the capacitor and the resistances of resistors 36 and 38 are properly selected, a proper high-pass filter can be obtained. The filtering function of filter 48 may be obtained by subtracting the output E46 (or E39) from the output E44.

Cue signal apparatuses which may be used with the present invention are:

(1) Japanese patent application No. 54-107516 (filed on Aug. 23, 1979).

(2) Japanese patent application No. 55-105568 (filed on July 31, 1980).

(3) Japanese patent application No. 55-132187 (filed on Sept. 22, 1980).

These applications were filed by the same assignee as in the present invention.

These applications correspond to U.S. patents, respectively, as follows:

(1) U.S. Pat. No. 4,389,685 issued on June 21, 1983, "CUE SIGNAL GENERATING SYSTEM", Inventor: K. FURUTA.

(2) U.S. Pat. No. 4,470,085 issued on Sept. 4, 1984, "CUE SIGNAL-RECORDING APPARATUS", Inventor: K. KANAYAMA.

(3) U.S. Pat. No. 4,420,777 issued on Dec. 13, 1983, "TAPE RECORDER WITH CUE PROCESSOR", Inventor: K. FURUTA.

The above Japanese patent applications and U.S. patents are incorporated by reference in the present application.

What is claimed is:

1. A cue recording system for a magnetic recorder, said system having a cue signal recording/reproducing function and using a plurality of recording tracks, comprising:

means for producing a recording signal;

first recording means coupled to said signal producing means for recording said recording signal on a first track, said first recording means including equalizer means for boosting a first low-frequency component of said recording signal over a first lwo frequency component range which includes a cue signal frequency:

cue signal generating means for producing said cue signal at a frequency within said first low frequency component range;

second recording means coupled to said signal producing means and including filtering means for removing a second low-frequency component of said recording signal over a second low-frequency component range, means for producing a composite signal including the recording signal from which said second low-frequency component is removed by said filtering means and said cue signal the frequency of which falls in the second low-frequency component removed from the recording signal, and means for recording said composite signal on a second track;

first reproducing means for reproducing first information, which corresponds to the recording signal with said low frequency component boosted by said equalizer means, from the first recording track;

second reproducing means for reproducing second information, which corresponds to the recording signal from which the second low-frequency component is removed, from the composite signal recorded on the second recording track, said second reproducing means including cue signal blocking means for preventing said cue signal from appearing in said second information;

cue signal detecting means coupled to an input of said cue signal blocking means for detecting the cue signal from the composite signal recorded on the second recording track, said cue signal detecting means including filter means for preventing the recording signal from which said second low-frequency component is removed from forming a part of said cue signal; and signal mixing means for mixing the reproduced first information from said first reproducing means with the reproduced second information from said second reproducing means, and for producing a playback signal corresponding only to the recording signal wherein said removed second low-frequency component is compensated by said first boosted low-frequency component so that low-frequency components of said recording signal are reproduced substantially flat in said playback signal absent said cue signal.

2. A system according to claim 1, wherein said magnetic recorder comprises a two-channel tape recorder, the recording signal is an audio signal, and the frequency of said cue signal is selected to be equal to or less than a substantially lowest audible frequency.

3. A multitrack cue recording system for a magnetic recorder, wherein a first track of the multitrack is used for a recording signal and a second track is used for a cue signal of a certain frequency and a signal derived from the recording signal, said recording system comprising:

means for producing a recording signal;

first recording means coupled to said signal producing means for recording, on said first track, first information representing only said recording signal, said first recording means including equalizer means for boosting, recording said first information, a first low-frequency component of said recording signal over a first low-frequency component range which includes a cue signal frequency;

cue signal generating means for producing said cue signal at a frequency within said first low-frequency component range;

second recording means coupled to said signal producing means and including first filtering means for removing a second low-frequency component of said recording signal over a second low-frequency component range to form a low-cut signal, means for producing second information representing said cue signal and the low-cut signal, the magnitude of said low-cut signal at the frequency of said cue signal being smaller than the magnitude of said recording signal at the cue signal frequency, and means for recording said second information on said second track;

first reproducing means for reproducing, from said first track, a first reproduction signal representing said first information wherein said first low-frequency component of the recording signal is boosted by said equalizer means;

second reproducing means including second filtering means for reproducing, from said second track, a second reproduction signal at an output of said second filtering means representing only said low-cut signal, said second reproducing means providing at an output of said second filtering means, a third reproduction signal representing said second information;

signal mixing means for mixing said first reproduction signal with said second reproduction signal, and for providing a playback signal corresponding only to said recording signal wherein said removed second low-frequency component is compensated by said boosted first low-frequency component so that low-frequency components of said recording signal are reproduced substantially flat in said playback signal absent said cue signal; and cue signal detecting means coupled to said input of said second filtering means for detecting, from said third reproduction signal, said cue signal.

4. A cue recording system according to claim 3, wherein said equalizer means of said first recording means includes means for boosting the frequency response of said recording signal at a first low-frequency component range which substantially coincides with the second low-frequency component range removed from said recording signal by said first filtering means of said second recording means.

5. A cue recording system according to claim 3, wherein said second reproducing means includes means for eliminating, from said third reproduction signal, a signal component at said certain frequency of said cue signal, and for providing said second reproduction signal.

6. A cue recording system according to claim 4, wherein said second reproducing means includes means for eliminating, from said third reproduction signal, a signal component at said certain frequency of said cue signal, and for providing said second reproduction signal.

7. A cue recording system according to claim 3, wherein said cue signal detecting means includes means for extracting, from said third reproduction signal, a signal component of said cue signal.

8. A cue recording system according to claim 4, wherein said cue signal detecting means includes means for extracting, from said third reproduction system, a signal component of said cue signal.

9. A cue recording system according to claim 5, wherein said cue signal detecting means includes means for extracting, from said third reproduction signal, a signal component of said cue signal.

10. A cue recording system according to claim 6, wherein said cue signal detecting means includes means for extracting, from said third reproduction signal, a signal component of said cue signal.

11. A cue recording system according to claim 3, wherein said magnetic recorder is a two-channel tape recorder, the one channel of which uses said first track and the other channel of which uses said second track; said recording signal contains an audio signal; and the frequency of said cue signal is selected from a frequency in the second low-frequency component range of said recording signal removed by said second recording means.

12. A cue recording system according to claim 4, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

13. A cue recording system according to claim 5, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

14. A cue recording system according to claim 6, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

15. A cue recording system according to claim 7, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

16. A cue recording system according to claim 8, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

17. A cue recording system according to claim 9, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

18. A cue recording system according to claim 10, wherein said magnetic recorder is a two-channel tape recorder, the one channel of which uses a first track and the other channel of which uses said second track; said recording signal contains an audio signal; and the frequency of said cue signal is selected from a frequency in the second low-frequency component range of said recording signal removed by said second recording means.

* * * * *